(12) United States Patent
Sun et al.

(10) Patent No.: US 7,315,575 B2
(45) Date of Patent: Jan. 1, 2008

(54) EQUALIZATION STRATEGY FOR DUAL-POLARIZATION OPTICAL TRANSPORT SYSTEM

(75) Inventors: Han Sun, Nepean (CA); Kuang Tsan Wu, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 780 days.

(21) Appl. No.: 10/793,801

(22) Filed: Mar. 8, 2004

(65) Prior Publication Data

US 2005/0196176 A1 Sep. 8, 2005

(51) Int. Cl.
*H03D 1/04* (2006.01)

(52) U.S. Cl. .................. 375/229; 375/346; 375/350; 375/348; 398/65; 398/149; 398/205; 398/209; 398/213

(58) Field of Classification Search ................ 375/229, 375/346, 350, 348; 398/65, 149, 152, 205, 398/209, 213
See application file for complete search history.

(56) References Cited

U.S. PATENT DOCUMENTS

| | | | | | |
|---|---|---|---|---|---|
| 4,112,370 | A | * | 9/1978 | Monsen | 370/201 |
| 4,635,276 | A | * | 1/1987 | Karabinis | 375/235 |
| 5,838,740 | A | * | 11/1998 | Kallman et al. | 375/346 |
| 2002/0061752 | A1 | * | 5/2002 | Kurokami | 455/447 |
| 2004/0127179 | A1 | * | 7/2004 | Sasaki | 455/146 |

OTHER PUBLICATIONS

"Digital, endless polarization control for polarization multiplexed fiber-optic communications", M. Tseytlin, O.Ritterbush, J. Schwarzwalder, and A. Salamon, Celight Inc., http://www.celight.com/images/pdfs/Celight_Coherent_Communications.pdf, Mar. 23-26, 2003.

"Secure Optical Communications Utilizing PSK Modulation, Polarization Multiplexing and Coherent Digital Homodyne Detection with Wavelength and Polarization Agility", A. Salamon, G. Levy-Yurista, M. Tseytlin, P.S. Cho, and I. Shpantzer, Celight Inc., http://www.celight.com/images/pdfs/Polarization_Presentation_OFC_2003.pdf, Oct. 13-16, 2003.

"Self-Recovering Equalization and Carrier Tracking in Two-dimensional Data Communication Systems", Dominique N. Godard, IEEE Transactions on Communications, vol. Com-28, No. 11, Nov. 1980.

(Continued)

*Primary Examiner*—Chieh M. Fan
*Assistant Examiner*—Aris Fotakis
(74) *Attorney, Agent, or Firm*—Jeffrey M. Measures; Borden Ladner Gervais LLP

(57) ABSTRACT

A method is provided for an equalization strategy for compensating channel distortions in a dual-polarization optical transport system wherein the received signal includes a complex signal of a first transmitted polarization component and a complex signal of a second transmitted polarization component. In a first step, a blind self recovery mode used a blind adaptation algorithm in calculating and modifying multiple complex equalizer transfer function coefficients to enables recovery of only the complex signal of the first transmitted polarization component. In a second step, equalization is performed in a training mode for recovery of the complex signals of the first and second transmitted polarization components. In a third step, equalization is performed in a data directed mode. The method is suited for a digital signal processing implementation in a coherent receiver.

28 Claims, 2 Drawing Sheets

OTHER PUBLICATIONS

"Synchronous and Fractionally-Spaced Blind Equalization in Dually-Polarized Digital Radio Links", Riccardo Raheli and Giorgio Picchi, Dipartimento di Ingegneria dell Informazione, Universita di Parma, Italy, 5.3.1-5.3.6 1991.

"Real-Time Adaptive Linear Prediction Using the Least Mean Square Gradient Algorithm", Dennis R. Morgan and Samuel E. Craig, IEEE Transaction on Acoustics, Speech, and Signal Processing, vol. ASSP-24, No. 6, Dec. 1976.

"A Simple Polarization-Recovery Algorithm for Dual-Polarized Cellular Mobile-Radio Systems in Time-Variant Faded Environments", Robert Cusani, Enzo Buccarelli, Guido Di Blasio, and Stefano Galli, IEEE Transactions on Vehicular Technology, vol. 49, No. 1, Jan. 2000.

* cited by examiner

EQUALIZATION STRATEGY FOR DUAL-POLARIZATION OPTICAL TRANSPORT SYSTEM

FIELD OF THE INVENTION

The invention relates to an equalization strategy for compensating for inter-symbol interference (ISI) and non-ideal characteristics of a fiber channel in a dual-polarization optical transport system for the purpose of recovering transmitted data bits.

BACKGROUND OF THE INVENTION

DWDM optical communications systems reached the level of being able to successfully transmit and receive 10 Gbits/s per wavelength channel in the late 1990's. In continuing to strive for even greater capacity designers of optical communication systems have had to become inventive about how to increase the spectral efficiency. There are a limited number of channels that can be used in the well-known C-band (1530 nm to 1560 nm) and L-band (1560 nm to 1610 nm) wavelength ranges. As more channels are packed into the useable wavelength range of the optical communications spectrum the constraints of optical components in the communication system need to become more stringent. Laser transmitters and optical bandpass filters need tighter controls and thus become more expensive to produce. Achieving higher transmission rates using more channels also means that additional infrastructure may be required if attempting to use a pre-existing optical network.

A physical property of light is that it can exist in two distinct linear polarization states. The two linear polarization states are orthogonal with respect to each other. Taking advantage of this property a single wavelength can be used to carry two signals, a first signal being modulated on a first linear polarization state and a second signal being modulated on a second linear polarization state, which is orthogonal to the first linear polarization state.

Quadrature carrier modulation in radio frequency communication systems is known. By modulating a portion of a signal with a local oscillator (LO) and modulating another portion of the signal with the same LO but phase shifted by 90 degrees, it is possible to double the transmission spectral efficiency while using the same frequency band.

Taking advantage of the dual-polarization property of light and quadrature carrier modulation it is possible to achieve a four fold improvement in transmission efficiency while using the same frequency band. As a result, conventional 10 Gbit/sec long haul and ultra-long haul communication networks are capable of achieving 40 Gbits/sec without the extra monetary expense caused by tighter specifications on the optical components of the communication system or significant upgrades to existing infrastructure.

However, the combination of polarization multiplexing with quadrature carrier modulation, has not previously been done in commercial optical transport systems. The challenge of implementing such a system is with the four fold improvement in transmission efficiency also comes increased difficulty in recovering transmitted signals at an optical coherent receiver of a quadrature carrier dual-polarization optical transport system.

An optical fiber transmission channel, hereafter referred to as a channel, introduces various forms of signal degradation that make it difficult to recover an original transmitted signal. Chromatic dispersion, polarization rotation, polarization mode dispersion (PMD) and polarization dependent loss (PDL) are typical factors that degrade the transmitted signal.

The transmitter and receiver components in the quadrature carrier dual-polarization optical communication system also introduce further signal degradation. Factors such as bandwidth limiting effects caused by inter-symbol interference (ISI), imperfections in the transmitter and receiver hardware, and phase noise generated by the transmitter laser and the receiver LO laser all degrade the transmitted signal.

Currently, there is no known equalization algorithm and/or strategy for effectively recovering more than one polarization multiplexed transmitted signal, which has been degraded by distortion mechanisms specific to the fiber optic transmission channel, in a quadrature carrier dual-polarization optical transport system.

SUMMARY OF THE INVENTION

A method is provided for equalization of channel distortion in a receiver of a dual-polarization optical transport system wherein a received signal is processed so that initially only one of two polarization-multiplexed transmit signals is recovered. Recovering only one transmit signal in an initial stage of the method ensures that convergence to a degenerate case where the same transmit signal appears on the two received polarization components is avoided.

In a first step, a blind self-recovery mode is used for calculating and modifying a first pair of complex equalizer transfer function coefficients with the aid of a blind adaptation algorithm. The complex equalizer transfer function coefficients form an equalizer that is used to cancel ISI and non-ideal channel characteristics and recover only the complex signal of the first transmitted polarization component. By recovering only the complex signal of the first transmitted polarization component the degenerate case of recovering only a singular transmitted polarization component at both outputs of an equalizer is prevented.

In a second step, equalization is performed in a training mode for calculating and modifying the first pair of complex equalizer transfer function coefficients and a second pair of complex equalizer transfer function coefficients to recover the complex signal of the first transmitted polarization component as well as the complex signal of the second transmitted polarization component. Training bits recovered from the received signal are used in combination with estimates of the complex signals of the first and second transmitted polarization components to create least mean square (LMS) errors. The LMS errors are used to optimize the complex equalizer transfer function coefficients.

In a third step, equalization is performed in a data directed mode for continuing to calculate and modify both the first and second pairs of complex equalizer transfer function coefficients to ensure continued recovery of the complex signal of the first transmitted polarization component and the complex signal of the second transmitted polarization component. Decision determined signals based on the estimates of the complex signals of the first and second transmitted polarization components are used in combination with the estimates of the complex signals of the first and second transmitted polarization components to create LMS errors. The LMS errors are used to continually optimize the complex equalizer transfer function coefficients in view of time varying channel characteristics.

The method is suited for a digital signal processing implementation in the coherent receiver. An application-specific integrated circuit (ASIC) is one form of implementation. An alternative implementation could use a digital signal processing (DSP) processor operating computer generated code.

The method is suited for a digital signal processing implementation in a coherent receiver when a modulation scheme used on a transmitted signal is quadriphase-shift keying (QPSK). In other embodiments, the method can be used with modulation schemes such as binary PSK, M-ary PSK where M>4, or Quadrature Amplitude Modulation (QAM).

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

A dual-polarization QPSK optical transport system consists of a transmitter, a transmission channel and a coherent receiver. The transmitter is responsible for generating a modulated optical signal, the transmission channel, which is typically a fiber optic transport link, conveys the modulated optical signal to the coherent receiver, and the coherent receiver is responsible for recovering the transmitted signal using a local oscillator (LO) with a frequency that is substantially matched to a transmitter laser.

The transmitted signal from the transmitter of the dual-polarization QPSK optical transport system is comprised of first and second polarization components, wherein the first and second polarization components each comprise first and second orthogonal signals that are a result of quadrature carrier modulation. Therefore the transmitted signal is comprised of a total of four separate signals. In the case of a 40 Gb/s dual-polarization QPSK optical transport system the four separate signals each have a symbol rate of 10 GHz (also known as 10 Gbaud). The first orthogonal signal is commonly known as an in-phase signal and the second orthogonal signal is commonly known as a quadrature signal. The in-phase signal is generated by modulating a first baseband signal with a transmitter carrier frequency and the quadrature signal is generated by modulating a second baseband signal with the transmitter carrier frequency that is 90 degrees out of phase with respect to the transmitter carrier frequency used to modulate the in-phase signal. The transmitter uses a transmitter carrier frequency that is an optical wavelength supplied by the transmitter laser.

Figure 1:
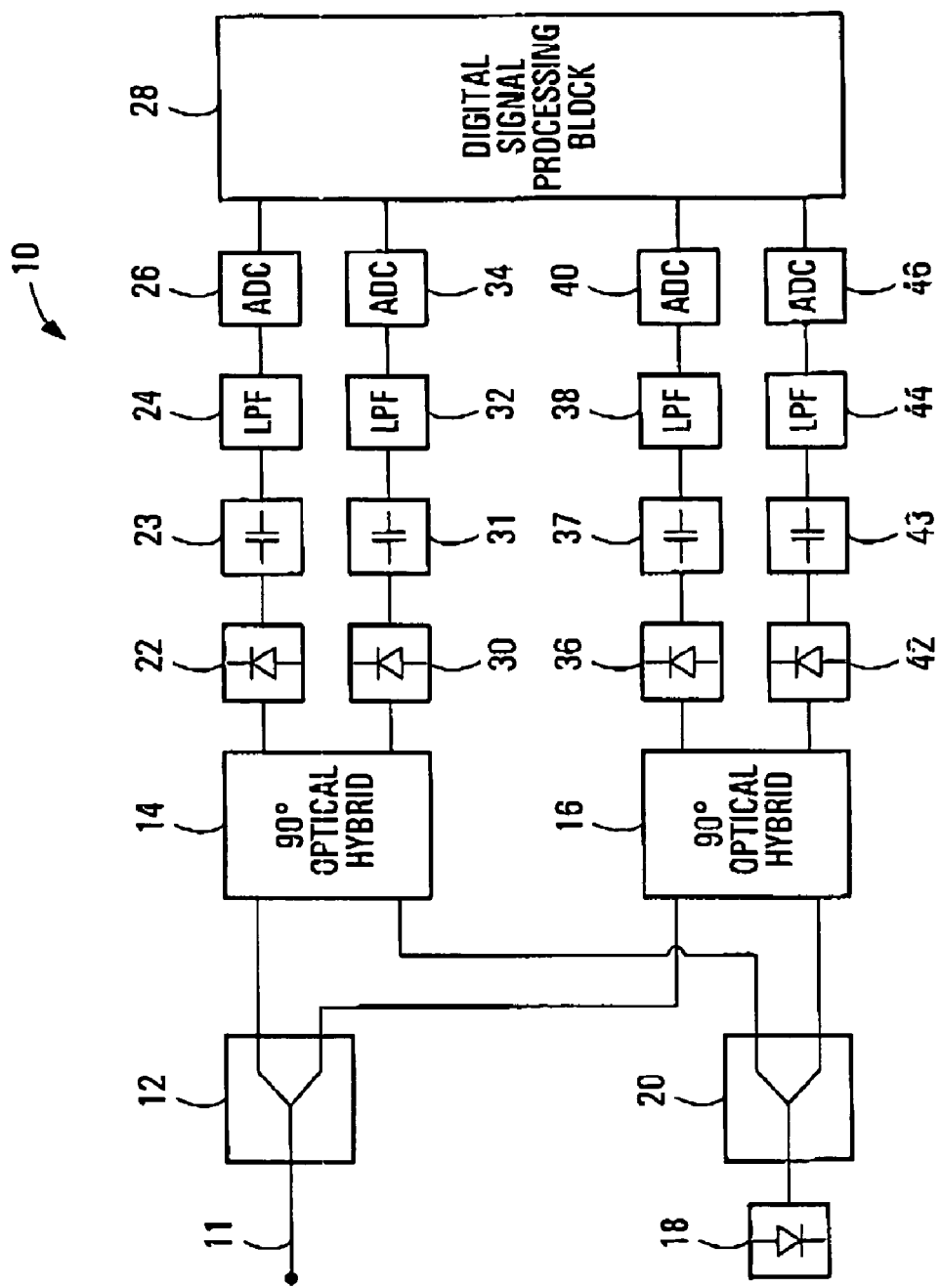
FIG. 1 is a schematic diagram a dual-polarization QPSK receiver.

FIG. 1 shows an example of a coherent receiver 10 used in a dual-polarization QPSK optical transport system. An input 11 to the coherent receiver is connected to a polarization beamsplitter 12. The polarization beamsplitter 12 has first and second outputs. The first output from the polarization beamsplitter 12 is connected to a first input port of a first 90 degree optical hybrid 14. The second output from the polarization beamsplitter 12 is connected to a first input port of a second 90 degree optical hybrid 16. A receiver LO laser 18 is connected to a 50/50 power splitter 20 with first and second outputs. The first output from the 50/50 power splitter 20 is connected to a second input port of the first 90 degree optical hybrid 14. The second output from the 50/50 power splitter 20 is connected to a second input port of the second 90 degree optical hybrid 16.

A first output port of the first 90 degree optical hybrid 14 is connected to a first photodetector 22. An output from the first photodetector 22 is connected to an input of a first AC coupling device 23. An output from the first AC coupling device 23 is in turn connected to an input of a first low pass filter 24. An output from the first low pass filter 24 is connected to a first analog to digital converter (ADC) 26.

The second output port of the first 90 degree optical hybrid is connected to a second photodetector 30, which is connected to a second AC coupling device 31, which is connected to a second low pass filter 32, which in turn is connected to a second ADC 34. The outputs from first and second output ports of the second 90 degree optical hybrid 16 are each connected in series to third and fourth photodetectors 36,42, third and fourth AC coupling devices 37,43, third and fourth low pass filters 38,44 and third and fourth ADCs 40,46 in the same way as the first and second outputs from the first 90 degree optical hybrid 14. The outputs from the four ADCs 26, 34, 40, 46 are connected to a digital signal processing block 28.

In operation, the transmitted signal, comprising an in-phase signal $\tilde{I}_X$ on the first polarization component, a quadrature signal $\tilde{Q}_X$ on the first polarization component, an in-phase signal $\tilde{I}_Y$ on the second polarization component and a quadrature signal $\tilde{Q}_Y$ on the second polarization component passes through the fiber optic transport link, which induces PMD, PDL and polarization rotation in the transmitted signal, and arrives at the input 11 of the coherent receiver 10. The polarization beamsplitter 12 serves to decompose the received signal into the first and second polarization components, which are orthogonal, but the first and second polarization components are no longer necessarily aligned with axes of polarization of the transmitter. The output from the polarization beamsplitter 12 has two outputs, each output containing a mixture of $\tilde{I}_X$, $\tilde{Q}_X$, $\tilde{I}_Y$ and $\tilde{Q}_Y$. The first polarization component is output from the first output of the polarization beamsplitter 12 and is supplied to the first input port of the first 90 degree optical hybrid 14. The second polarization component is output from the second output of the polarization beamsplitter 12 and is supplied to the first input port of the second 90 degree optical hybrid 16. The receiver LO laser 18 supplies an optical signal with a wavelength substantially the same as the transmitter laser (not shown) to the 50/50 power splitter 20. The optical signal from the receiver LO laser 18 is separated into first and second LO laser optical signals. The first LO laser optical signal is input to the second input port of the first 90 degree optical hybrid 14 and the second LO laser optical signal is input to the second input port of the second 90 degree optical hybrid 16.

The first 90 degree optical hybrid 14 is able to mix the first received and decomposed polarization component, designated as $I_X$ and $Q_X$, with the first LO laser optical signal and the first LO laser optical signal shifted by 90 degrees. The second 90 degree optical hybrid 16 is able to mix the second received and decomposed polarization component, designated as $I_Y$ and $Q_Y$, with the second LO laser optical signal and the second LO laser optical signal shifted by 90 degrees. Precautions are required to ensure that the first and second LO laser optical signals have linear polarizations and the linear polarizations are matched to that of the first and second polarization components supplied to the first and second 90 optical hybrids 14, 16.

The first output of the first 90 degree optical hybrid 14 is still a purely optical signal containing signal components $(I_X,Q_X)+LO$. If LO laser optical signal power is greater than received signal power at the photodetectors 22, 30, 36, 42, than the electrical signal after AC coupling is a mixing of an LO and a received signal. Using the first photodetector 22 as a square law mixing device it is possible to recover a first baseband electrical signal that is proportional to $I_X$. The second output of the first 90 degree optical hybrid 14 contains signal components $(I_X,Q_X)+(90\text{ degree shifted LO})$. The second photodetector 30 is used similarly to the first photodetector 22 to recover a second baseband electrical signal that is proportional to $Q_X$. The first and second AC coupling devices 23,31 are used to remove DC components that arise from the use of the first and second photodetectors 22,30 as square law mixing devices. The first and second low pass filters 24,32 serve to eliminate any high frequency components that arise from the use of the first and second photodetectors 22,30 as square law mixing devices and also serve as anti-aliasing filters before the ADCs 26,34. The first and second ADCs 26,34 allow first and second baseband electrical signals to be sampled and converted from analog signals to digital signals, which is easier to use for digital signal processing purposes. The sampling rate of the ADCs 26,34 can be either T-spaced or fractionally T-spaced.

The first and second outputs from the second 90 degree optical hybrid 16 are operated upon in a similar manner to produce third and fourth baseband electrical signals that are proportional to $I_Y$ and $Q_Y$ at the outputs of the third and fourth photodetectors 36,42. The third and fourth baseband electrical signals which are proportional to $I_Y$ and $Q_Y$ have DC components removed using the third and forth AC coupling devices 37,43, are filtered with the third and fourth low pass filters 38,44 and are sampled and converted from analog to digital signals with the third and fourth ADCs 40,46. The outputs of the four ADCs 26,34,40,46 are supplied to the digital signal processing block 28.

The polarization beamsplitter 12 and the 50/50 power splitter 20 are of any common type available that are capable of performing the tasks of decomposing light into two constituent polarization components and dividing an optical power of a light source into two substantially equal optical powers, respectively.

The photodetectors 22, 30, 36, 42 should have enough bandwidth to encompass the spectral content of the signal. The photodetectors 22, 30, 36, 42 are typically PIN photodiodes. More generally, the photodetectors can be any type of optical device that can detect light and convert it into an electrical signal.

An alternative embodiment to using four separate photodetectors 22, 30, 36, 42, as shown in FIG. 1, is to use balanced photodetectors.

The AC coupling devices 23, 31, 37, 43 are typically capacitors.

Four signal paths that exist between the polarization beamsplitter 12 and the first 90 degree optical hybrid, the polarization beamsplitter 12 and the second 90 degree optical hybrid, the 50/50 power splitter 20 and the first 90 degree optical hybrid 14 and the 50/50 power splitter 20 and the second 90 degree optical hybrid 14 must all be calibrated with respect to one another. In the example of the 10 Gbaud system, the calibration of the signal paths must be within +/−5 picoseconds (ps) of each other.

Signal paths that exist between the first and second output ports of the first 90 degree optical hybrid and the digital signal block 28 and the first and second output ports of the second 90 degree optical hybrid and the digital signal block 28 must all be calibrated with respect to one another. In the example of the 10 Gbaud system, the calibration of the signal paths must be within +/−5 ps of each other.

The sampling of the ADCs 26, 34, 40, 46 can be either T-spaced or fractionally T-spaced. Sampling clocks of the ADCs 26, 34, 40, 46 should be synchronized.

The receiver LO laser 18 and the transmitter laser must have low linewidths, for example 2 to 3 MHz. The receiver LO laser 18 must also have low relative intensity noise (RIN), for example approximately −140 dBc/Hz or better. The receiver LO laser 18 and the transmitter laser must be frequency stable. A suitable laser source for use as the receiver LO laser 18 or the transmitter laser is a standard OC-192 distributed feedback (DFB) laser.

The 90 degree optical hybrids 14,16 can be of the type described in U.S. patent application Ser. No. 10/185,136 entitled "3 Fibre I and Q Coupler" filed on Jun. 28, 2002 and hereby incorporated by reference in its entirety.

Once the four electrical baseband signals have been recovered and converted to digital signal representations of the four electrical baseband signals using the four ADCs 26, 34, 40, 46 it is necessary to use the digital signal processing block 28 to correct for signal degradations that occur due to non-ideal channel characteristics. The digital signal processing block 28 implements an equalization and recovery strategy comprising the capability for polarization tracking, polarization mode dispersion cancellation, polarization dependent loss distortion cancellation, cancellation of ISI due to bandwidth limiting electronics and carrier phase tracking.

The equalization and recovery strategy is required to overcome a problem of being able to recover training information in the transmitted signal to enable a training mode. The training mode allows the receiver to estimate inverse channel characteristics of the received signal and compensate for distortion generated by the channel. One way to solve the problem is to use a class of equalization algorithms known as blind adaptation algorithms. These blind adaptation algorithms do not require a priori knowledge of the transmitted bits and have been proven to be robust. Blind adaptation algorithms are based on maximizing a cost function. In most cases the cost function is a signal to noise ratio at an output of the equalizer. One such example of a blind adaptation algorithm is the Godard blind algorithm.

Without aid of transmitted bits, a straight forward application of a blind adaptation algorithm to recover transmitted signals on both polarization components simultaneously is vulnerable to a degenerate case where outputs of the first and second pairs of the complex transfer function coefficients are the same and the receiver recovers a signal transmitted on only one polarization component. This vulnerability is unique and previously unknown. The problem exists in optical, dual-polarization multiplexed systems, and is a result of the properties of the optical channel. It can be illustrated with respect to four scenarios described below.

In a first scenario, the channel characteristic C is a polarization rotation of 45 degrees. The equalizer blindly converges to a state where the equalizer transfer function H implements a polarization rotation of −45 degrees. In this scenario the equalizer transfer function H is the inverse of the channel characteristic C and results in a product equal to the identity matrix. The equalizer has inverted the channel characteristic in a desired manner.

$$\begin{bmatrix} 1 & 0 \\ 0 & 1 \end{bmatrix} = \begin{bmatrix} H_{xx}(\varpi) & H_{yx}(\varpi) \\ H_{xy}(\varpi) & H_{yy}(\varpi) \end{bmatrix} \begin{bmatrix} C_{xx}(\varpi) & C_{yx}(\varpi) \\ C_{xy}(\varpi) & C_{yy}(\varpi) \end{bmatrix} \quad (4)$$

$$= \begin{bmatrix} 1/\sqrt{2} & 1/\sqrt{2} \\ -1/\sqrt{2} & 1/\sqrt{2} \end{bmatrix} \begin{bmatrix} 1/\sqrt{2} & -1/\sqrt{2} \\ 1/\sqrt{2} & 1/\sqrt{2} \end{bmatrix}$$

$$\begin{bmatrix} T_x \\ T_y \end{bmatrix} = \begin{bmatrix} 1 & 0 \\ 0 & 1 \end{bmatrix} \begin{bmatrix} T_x \\ T_y \end{bmatrix}$$

A second scenario is a polarization rotation caused by the channel characteristic of the same 45 degrees as in the first scenario, however the blind adaptation algorithm forces the equalizer to converge to an equivalent polarization rotation of 45 degrees.

$$\begin{bmatrix} 0 & -1 \\ 1 & 0 \end{bmatrix} = \begin{bmatrix} H_{xx}(\varpi) & H_{yx}(\varpi) \\ H_{xy}(\varpi) & H_{yy}(\varpi) \end{bmatrix} \begin{bmatrix} C_{xx}(\varpi) & C_{yx}(\varpi) \\ C_{xy}(\varpi) & C_{yy}(\varpi) \end{bmatrix} \quad (5)$$

$$= \begin{bmatrix} 1/\sqrt{2} & -1/\sqrt{2} \\ 1/\sqrt{2} & 1/\sqrt{2} \end{bmatrix} \begin{bmatrix} 1/\sqrt{2} & -1/\sqrt{2} \\ 1/\sqrt{2} & 1/\sqrt{2} \end{bmatrix}$$

$$\begin{bmatrix} -T_y \\ T_x \end{bmatrix} = \begin{bmatrix} 0 & -1 \\ 1 & 0 \end{bmatrix} \begin{bmatrix} T_x \\ T_y \end{bmatrix}$$

Blind adaptation algorithms that maximize the signal to noise ratio at the output of the equalizer treat the second scenario in the same manner as the first scenario. The result is that the signal to noise ratio at the output of the equalizer is indeed maximized, however transmitted complex signals $T_x$ and $T_y$ have swapped positions and $T_y$ is negated. This problem can be easily overcome by a variety of methods once the received signals are converted to bits. Nevertheless, compensating for this type of problem results in added complexity for the receiver.

A third scenario involves a polarization rotation in the channel of the same 45 degrees as in the first scenario, but the blind adaptation algorithm forces the equalizer to converge to a singular state where elements in a second row of matrix resulting from a product of the channel characteristic C and the equalizer transfer function H are the same as elements of a first row of the matrix. This is shown in equation 6. This type of convergence occurs because the cost function maximized by the blind adaptation algorithm does not depend on the transmitted complex signals $T_x$ and $T_y$. In the third scenario only one polarization component is recovered. The same transmitted complex signal $T_x$ appears at both outputs of the equalizer with each of the outputs of the equalizer. This type of signal recovery failure must be prevented.

$$\begin{bmatrix} 1 & 0 \\ 1 & 0 \end{bmatrix} = \begin{bmatrix} H_{xx}(\varpi) & H_{yx}(\varpi) \\ H_{xy}(\varpi) & H_{yy}(\varpi) \end{bmatrix} \begin{bmatrix} C_{xx}(\varpi) & C_{yx}(\varpi) \\ C_{xy}(\varpi) & C_{yy}(\varpi) \end{bmatrix} \quad (6)$$

$$= \begin{bmatrix} 1/\sqrt{2} & 1/\sqrt{2} \\ 1/\sqrt{2} & 1/\sqrt{2} \end{bmatrix} \begin{bmatrix} 1/\sqrt{2} & -1/\sqrt{2} \\ 1/\sqrt{2} & 1/\sqrt{2} \end{bmatrix}$$

$$\begin{bmatrix} T_x \\ T_x \end{bmatrix} = \begin{bmatrix} 1 & 0 \\ 1 & 0 \end{bmatrix} \begin{bmatrix} T_x \\ T_y \end{bmatrix}$$

A fourth scenario is a converse situation of the third scenario, where the blind adaptation algorithm forces the equalizer to converge to another singular state. In this scenario only the transmitted complex signal on the second single polarization component $T_y$ appears at both outputs.

$$\begin{bmatrix} 0 & 1 \\ 0 & 1 \end{bmatrix} = \begin{bmatrix} H_{xx}(\varpi) & H_{yx}(\varpi) \\ H_{xy}(\varpi) & H_{yy}(\varpi) \end{bmatrix} \begin{bmatrix} C_{xx}(\varpi) & C_{yx}(\varpi) \\ C_{xy}(\varpi) & C_{yy}(\varpi) \end{bmatrix} \quad (7)$$

$$= \begin{bmatrix} -1/\sqrt{2} & 1/\sqrt{2} \\ -1/\sqrt{2} & 1/\sqrt{2} \end{bmatrix} \begin{bmatrix} 1/\sqrt{2} & -1/\sqrt{2} \\ 1/\sqrt{2} & 1/\sqrt{2} \end{bmatrix}$$

$$\begin{bmatrix} T_y \\ T_y \end{bmatrix} = \begin{bmatrix} 0 & 1 \\ 0 & 1 \end{bmatrix} \begin{bmatrix} T_x \\ T_y \end{bmatrix}$$

It is necessary to eliminate a possibility of an occurrence of the degenerate case where a transmitted signal of a single polarization component is received at both outputs of the equalizer in the receiver of a dual-polarization optical transport system. One possible solution to the third and fourth scenarios that were previously described is to exploit symmetries in a dual-polarization channel response by imposing constraints on complex equalizer transfer function coefficients $H_{xx}(\omega)$, $H_{yx}(\omega)$, $H_{xy}(\omega)$, and $H_{yy}(\omega)$. The corresponding time-domain responses are $h_{xx}(t)$, $h_{yx}(t)$, $h_{xy}(t)$, and $h_{yy}(t)$, respectively. An example of this type of solution is altering a conventional blind adaptation algorithm with a following constraint:

$$h_{yy}(t) = h^*_{xx}(-t)$$

$$h_{xy}(t) = -h^*_{yx}(-t) \quad (8)$$

The constraint defined in equation 8 exploits symmetry in elements of the channel characteristic C that are a property of polarization rotation, PMD, and chromatic dispersion. If the constraint is applied to the blind adaptation algorithm used to achieve convergence of the equalizer transfer function H, the output of the equalizer transfer function will never be singular, and therefore the receiver will avoid the degenerate case.

Most optical components in a transmission system, including erbium-doped fiber amplifiers (EDFA), have PDL. The effect of PDL coupled with PMD, is that the symmetry defined by the above constraint is disrupted. In the presence of PDL, the complex equalizer transfer function coefficients $H_{xx}(\omega)$, $H_{yx}(\omega)$, $H_{xy}(\omega)$ and $H_{yy}(\omega)$ that invert the channel are generally arbitrary.

The process presented herein uses a blind self-recovery mode that involves a blind adaptation algorithm to initialize the equalizer while avoiding the singular output illustrated by the third and fourth scenarios. In a second training mode step, the process takes advantage of a pre-determined set of training bits to fully equalize the channel. In a third step, after the training mode has allowed the equalizer to generate a suitable estimate of the inverse of the channel characteristic, the equalization process continues using data output from the equalizer to maintain the estimate of the inverse of the channel characteristic over time. The complex equalizer transfer function coefficients are allowed to be arbitrary in order to equalize channels with significant PDL. The process is a robust acquisition strategy that can recover transmitted data bits from both polarization components, while preventing the degenerate case.

Before initiating the equalization process it is necessary to pre-process the received signal to ensure that any signal distortion of the quadrature modulated signals on the first and second polarization components caused by the optical 90 degree hybrid in the coherent optical receiver have been corrected. Correction of I-Q quadrature phase angle error and I-Q quadrature gain error are examples of distortion caused by the optical 90 degree hybrid. Methods of correction of I-Q quadrature phase angle error can be found in corresponding U.S. patent application Ser. No. 10/778026 entitled "Method for Quadrature Phase Angle Correction in a Coherent Receiver of a Dual-Polarization Optical Transport System" filed on Feb. 16, 2004 hereby incorporated by reference in its entirety.

The blind self-recovery mode allows for the calculation of modification of a first pair of complex transfer function coefficients comprising first and second complex equalizer transfer function coefficients that compensate for channel distortions and generate an estimate of the transmitted complex signal, comprising the in-phase and quadrature signals, of the first polarization component. The first stage also includes the use of carrier phase determining to compensate for carrier phase variations in the received signal. Once the first and second complex equalizer transfer function coefficients begin to converge to the point that boundaries of individual frames of data of the received complex signal of the first polarization component are able to be determined and training information within the individual frames is recovered, a training mode is initiated.

The training mode involves using the first and second complex equalizer transfer function coefficients to improve an estimate of the transmitted complex signal of the first polarization component as well using a second pair of complex transfer function coefficients comprising third and fourth complex equalizer transfer function coefficients to generate and improve an estimate of the transmitted complex signal of the second polarization component. During the training mode, the training information recovered in the blind self-recovery mode is used to generate first and second LMS training mode errors. The first and second LMS training mode errors are used in calculating and modifying the first, second, third, and fourth complex equalizer transfer function coefficients. The four complex equalizer transfer function coefficients are modified so that the estimates of the transmitted complex signals of the first and second polarization components will have minimum ISI and noise enhancement resulting from the equalization process. When the four complex equalizer transfer function coefficients have converged to as desirable level, a data directed mode is initiated.

The data directed mode continues to use the first, second, third, and fourth complex equalizer transfer function coefficients to compensate for channel distortions that occur due to the time varying nature of the channel. The data directed mode uses an equalized estimate of the transmitted signal of the respective polarization component and decision determined output signal from the respective polarization component of the equalizer to create first and second LMS data directed mode errors. The first and second LMS data directed mode errors are used in calculating and modifying the first, second, third, and fourth complex equalizer transfer function coefficients.

Figure 2:
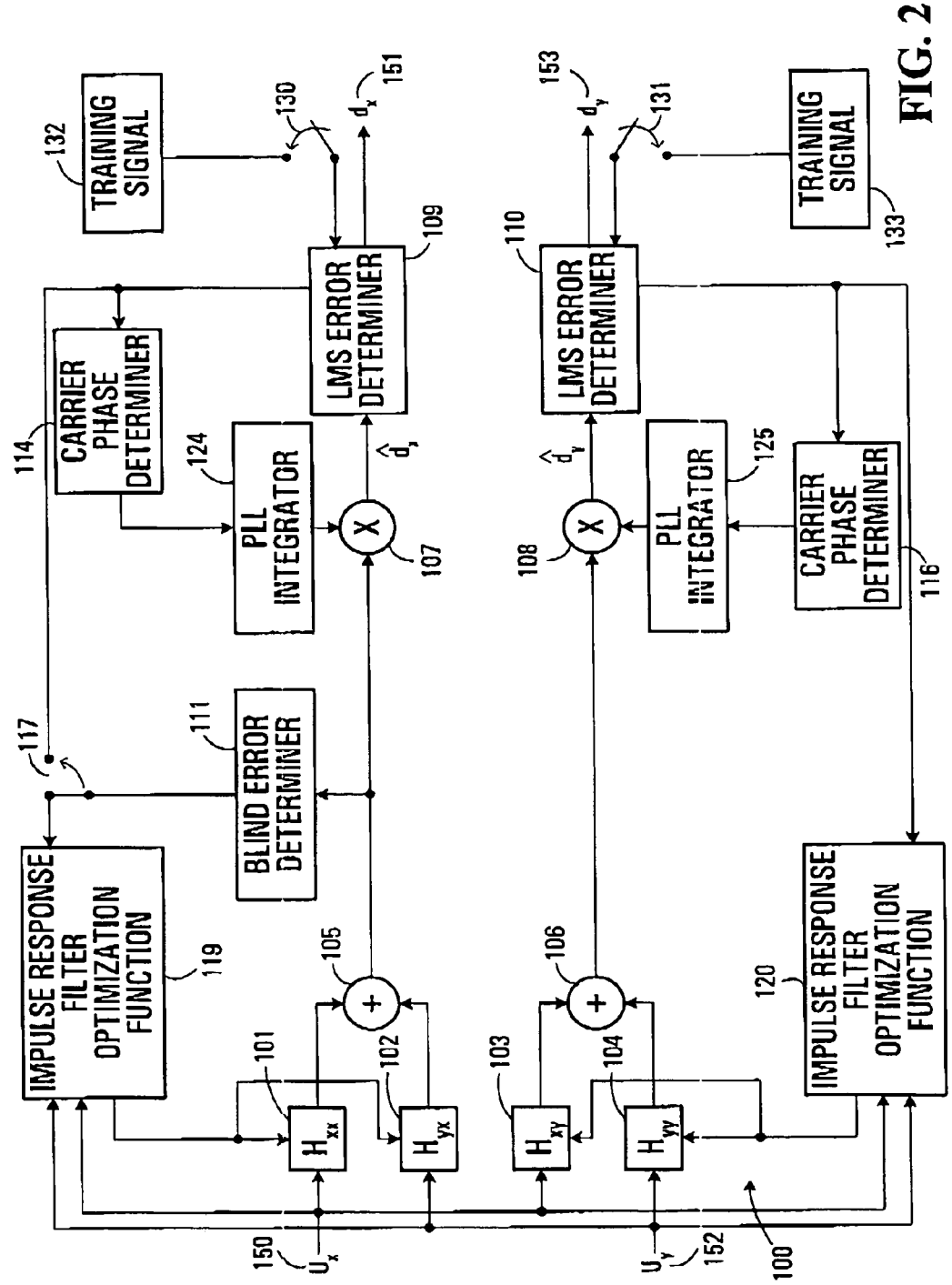
FIG. 2 is a schematic of an example digital signal processing implementation of an equalization and recovery strategy for use in a dual-polarization QPSK receiver.

FIG. 2 depicts a schematic of an example equalization process 100 that could be implemented by the digital signal processing block 28 of FIG. 1. The equalization process 100 is used to compensate for the non-ideal channel characteristics imposed on the transmitted signal and to perform carrier phase tracking. First and second inputs 150,152 are supplied to the equalization process 100. The first input 150 is supplied to a first impulse response filter $H_{xx}$ 101, which represents a first complex equalizer transfer function coefficient and a second impulse response filter $H_{xy}$ 103, which represents a second complex equalizer transfer function coefficient. The first input 150 is also supplied to a first impulse response filter optimization function 119 and a second impulse response filter optimization function 120. The second input 152 is supplied to a third impulse response filter $H_{xy}$ 102, which represents a third complex equalizer transfer function coefficient and a fourth impulse response filter $H_{yy}$ 104, which represents a fourth complex equalizer transfer function coefficient. The second input 152 is also supplied to the first impulse response filter optimization function 119 and the second impulse response filter optimization function 120.

Outputs of the first impulse response filter 101 and the third impulse response filter 102 are supplied to a first summer 105. An output from the first summer 105 is supplied to a first complex multiplier 107. An output from the first complex multiplier 107 is supplied to a first LMS error determiner 109. A first output from the first LMS error determiner 109 is a first output 151 from the equalizer implementation 100.

The output from the first summer 105 is also supplied to a first blind error determiner 111. An output from the first blind error determiner 111 is supplied to a first switching function 117. The first switching function 117 is also connected to the first impulse response filter optimization function 119. The first impulse response filter optimization function 119 has first and second outputs. The first output is supplied to the first impulse response filter 101 and the second output is supplied to the third impulse response filter 102.

A second output from the first LMS error determiner 109 is supplied to the first switching function 117. The second output from the first LMS error determiner 109 is also connected to a first carrier phase determiner 114. An output from the first carrier phase determiner 114 is supplied to a first phase lock loop (PLL) integrator 124. An output from the first PLL integrator 124 is supplied to the first complex multiplier 107.

A first synchronized receiver training signal 132 is supplied to a second switching function 130. The second switching function 130 is also connected to the first LMS error determiner 109.

Outputs of the second impulse response filter 103 and the fourth impulse response filter 104 are supplied to a second summer 106. An output from the second summer 106 is supplied to a second complex multiplier 108. An output from the second complex multiplier 108 is supplied to a second LMS error determiner 110. A first output from the second LMS error determiner 110 is a second output 153 from the equalizer implementation 100.

A second output from the second LMS error determiner 110 is supplied to the second impulse response filter optimization function 120. The second impulse response filter optimization function 120 has first and second outputs. The first output is supplied to the second impulse response filter 103 and the second output is supplied to the fourth impulse response filter 104.

The second output from the second LMS error determiner 110 is also connected to a second carrier phase determiner 116. An output from the second carrier phase determiner 116 is supplied to a second PLL integrator 125. An output from the second PLL integrator 125 is supplied to the second complex multiplier 108.

A second synchronized receiver training signal 133 is supplied to a third switching function 131. The third switching function 131 is also connected to the second LMS error determiner 110.

In operation, a first complex signal $U_x$ is supplied to the first input 150 of the equalizer implementation 100 and a second complex signal $U_y$ is supplied to the second input 152 of the equalizer implementation 100. The first complex signal is supplied to the first impulse response filter 101, the second impulse response filter 103, the first impulse response filter optimization function 119 and the second impulse response filter optimization function 120. The second complex signal is supplied to the third impulse response filter 102, the fourth impulse response filter 104, the first impulse response filter optimization function 119 and the second impulse response filter optimization function 120.

The blind self-recovery mode initially sets and then in an iterative manner modifies the first and third impulse response filters 101,102.

During the initialization of the blind self-recovery mode the first switching function 117 connects the output from the first blind error determiner 111 with the first impulse response filter optimization function 119. Therefore, the output of the first LMS error determiner 109 does not supply any signal to the first impulse response filter optimization function 119 as the first switching function 117 between these two functions is considered "open".

During the course of the blind self-recovery mode the outputs of the first impulse response filter 101 and the third impulse response filter 102 are supplied to the first summer 105. The weighting of the first and second complex signals by the first and third impulse response filters 101,102 act as a linear convolution function. The ISI component of the received complex signal is reduced with each iterative update of the first and third impulse response filters 101,102. The output of the first summer 105, an equalized version of the received complex signal of the first polarization component, is supplied to the blind error determiner 111. The blind error determiner 111 is responsible for using a blind adaptation algorithm to maximize a cost function, for example a signal to noise ratio, of the equalized version of the received complex signal of the first polarization component output from the first summer 105. The maximized cost function output of the blind error determiner 111 is supplied to the first impulse response filter optimization function 119 via the first switching function 117.

The blind self-recovery mode uses the maximized cost function output from the first blind error determiner 111 as an input to the first impulse response filter optimization function 119. The maximized cost function in combination with the first and second complex signals $U_x, U_y$ are used to modify the first and third impulse response filters 101,102 via the first and second outputs from the first impulse response filter optimization function 119.

The equalized version of the received complex signal of the first polarization component output of the first summer 105 is also supplied to the first complex multiplier 107.

The first phase lock loop integrator 124 integrates the output from the carrier phase determiner 114 and determines the phase angle variation of the received complex signal of the first polarization component. Using the first complex multiplier 107 to multiply the output of the first phase lock loop integrator 124 and the output of the first summer 105 results in generating a carrier phase compensated estimate of the received complex signal of the first polarization component $\hat{d}_x$.

The output of the first complex multiplier 107 is supplied to the first LMS error determiner 109, which is responsible for making a final decision regarding a state of transmitted bits of the received complex signal of the first polarization component and outputs a decision determined received complex signal of the first polarization component $d_x$ at the first output 151.

The first LMS error determiner 109 also outputs a first LMS error. The first LMS error is a difference between the decision determined received complex signal of the first polarization component $d_x$ and the carrier phase compensated estimate of the received complex signal of the first polarization component $\hat{d}_x$. The first LMS error is supplied to the first carrier phase determiner 114, which determines the carrier phase angle. The output from the first carrier phase determiner 114 is supplied to the first phase lock loop integrator 124.

The blind self-recovery mode continues in this manner, updating the first and third impulse response filters 101,102 until it is possible to clearly identify data frame boundaries from the decision determined received complex signal of the first polarization. Identifying the data frame boundaries provides the ability to identify data frames and therefore recover the training information contained in the received signal. It is necessary to correlate training information regarding each polarization component stored in the memory of the receiver with the recovered training information contained in the received signal. A resulting correlation peak is then compared to a threshold value to identify which one of the two polarization components has been recovered. When a transmitted polarization component has been properly identified it is appropriate to advance to the training mode.

The following section is described with respect to a first transmitted polarization component being the recovered transmitted polarization component. In a situation that the second transmitted polarization component is recovered, then signals generated by the first synchronized receiver training signal 132 would actually correspond to training information relating to the second transmitted polarization component.

Once the training mode is initiated the first switching function 117 disconnects the first blind error determiner 111 from the first impulse response filter optimization function 119 and connects the output from the LMS error determiner 109 to the first impulse response filter optimization function 119. Also, the second switching function 130 connects the output from the first synchronized receiver training signal 132 to the LMS error determiner 109. A first LMS training mode error generated by the LMS error determiner 109 is a true error value between the carrier phase compensated estimate of the received complex signal of the first polarization component and the training information contained in the received signal as generated by the first synchronized receiver training signal 132. The first LMS training mode error supplied to the first impulse response filter optimization function 119 is used in combination with the first and second complex signals $U_x, U_y$ to continue modifying the first and third impulse response filters 101,102 via the first and second outputs from the first impulse response filter optimization function 119. The ISI component of the received complex signal is reduced with each iterative update of the first and third impulse response filters 101,102 during the training mode.

The first LMS training mode error is also supplied to the first carrier phase determiner 114. As in the first stage, the first carrier phase determiner 114 determines the carrier phase angle. The output of the first carrier phase determiner 114 is supplied to the first PLL integrator 124.

During the training mode the second impulse response filter optimization function 120 initializes the second and fourth impulse response filters 103,104 and then continues to iteratively modify the second and fourth impulse response filters 103,104.

The outputs of the second impulse response filter 103 and the fourth impulse response filter 104 are supplied to the second summer 106. The weighting of the first and second complex signals by the second and fourth impulse response filters 103,104 act as a linear convolution function. The ISI component of the received complex signal is reduced with each iterative update of the second and fourth impulse response filters 103,104 during the training mode.

During the initialization of the training mode the third switching function 131 ensures the second synchronized receiver training signal 133 is connected to the second LMS error determiner 110. A second LMS training mode error that is generated by the second LMS error determiner 110 is a true error value between a carrier phase compensated estimate of the received complex signal of the second polarization component input to the second LMS error determiner 110 and the training data contained in the received signal as generated by the second synchronized receiver training signal 133. The second LMS training mode error is supplied directly to the second impulse response filter optimization function 120. The second LMS training mode error supplied to the second impulse response filter optimization function 120 is used in combination with the first and second complex signals $U_x, U_y$ to continue modifying the second and fourth impulse response filters 103,104 via the first and second outputs from the second impulse response filter optimization function 120.

The second LMS error is also supplied to the second carrier phase determiner 116. The second carrier phase determiner 116 determines the carrier phase angle. The output of the second carrier phase determiner 116 is supplied to the second PLL integrator 125.

When the training mode has allowed the first, second, third, and fourth impulse response filters 101, 103, 102, 104 to reach a level of convergence that ensures the four impulse response filters 101, 103, 102, 104 are most accurately estimating the inverse channel, it is time to advance to the data directed mode.

The data directed mode requires the second switching function 130 to disconnect the first synchronized receiver training signal 132 from the first LMS error determiner 109. Similarly, the third switching function 131 disconnects the second synchronized receiver training signal 133 from the second LMS error determiner 110. During the data directed mode a first LMS data directed mode error is generated that is a difference between an input to the first LMS error determiner 109 and an output of an internal decision device that produces an estimate of the transmitted signal of the first polarization component, which is describe above as the decision determined received complex signal of the first polarization component $d_x$. A second LMS data directed mode error is generated that is a difference between an input to the second LMS error determiner 110 and an output from an internal decision device that produces an estimate of the transmitted signal of the second polarization component, which is a decision determined received complex signal of the second polarization component $d_y$.

During operation of the data directed mode, the first impulse response filter optimization function 119 uses the first LMS data directed mode error in combination with the first and second complex signals $U_x, U_y$ to continually update the first and third impulse response filters 101,102. The second impulse response filter optimization function 120 uses the second LMS data directed mode error in combination with the first and second complex signals to continually update the second and fourth impulse response filters 103, 104.

The data directed mode operates in a similar manner to the training mode except that in the data directed mode the first and second LMS data directed mode errors are used in modifying the first, second, third, and forth complex transfer function coefficients, while in the training mode the first and second LMS training mode errors are used in modifying the first, second, third, and forth complex transfer function coefficients.

In some embodiments of the invention the digital signal processing block 28 can be a processing element such as an application-specific integrated circuit (ASIC). In other embodiments the digital signal processing block 28 can be a implemented as computer readable program code that exists on a computer useable medium, for example a DSP processor capable of storing and processing computer readable program code.

The first and second carrier phase determiners 114,116 comprise any form of digital logic implementation which enable determination of the carrier phase angle.

The first and second phase lock loop integrators 124,125 comprise any form of digital signal processing implementation which can make determinations of the carrier phase variations of equalized versions of the complex signals based on information output from the first and second carrier phase determiners 114,116.

The first, second, third and fourth impulse response filters 101, 103, 102, 104 comprise any form of digital signal processing implementation which allow the impulse response filters to act as complex equalizer transfer function coefficients.

In some embodiments provided by the invention the impulse response filters are linear tap delay transversal equalizers. The linear tap delay transversal equalizers weight current and past values of a received signal using coefficients, known as tap gains, to generate an estimate of the inverse channel characteristics and produce a result that is an estimate of the transmitted signal. In the embodiments when the impulse response filters are linear tap delay transversal equalizers the first and second impulse response filter optimization functions 119,120 act to generate and iteratively modify the tap gains so as to compensate for the non-ideal channel characteristics.

In a particular embodiment of the invention the first, second, third and fourth impulse response filters 101, 103, 102, 104 are complex Finite Impulse Response (FIR) filters which are represented by 16 real FIR filters. These 16 real FIR filters can be independently updated by an appropriate algorithm that allows the invention to work in a manner described herein or in a manner that is substantially similar to that described herein.

In alternate embodiments the complex equalizer function can be implemented in the frequency domain, known as frequency-domain equalization (FDE), using fast Fourier transform (FFT) techniques. The FDE is used for more efficient calculation in the case where a large number of equalizer taps is required.

In some embodiments of the invention a least mean squares process is used to generate LMS errors which are in turn used to modify the impulse response filters. More generally, any type of minimization process could be used to generate the LMS errors as long as the minimization process optimizes a balance between ISI cancellation and noise enhancement which occurs during equalization of the received complex signals of the first and second polarization components. Examples of alternative minimization processes are recursive least squares (RLS) and zero forcing (ZR).

The equalization and recovery strategy presented herein is robust to severe channel distortion encountered within the optical fiber such as polarization rotation, PMD, PDL and chromatic dispersion.

In a particular embodiment of the invention, the strategy for equalization and recovery of complex signals of first and second polarization components is applied to a dual-polarization QPSK optical transport system. More generally, the strategy for equalization and recovery of complex signals of first and second polarization components can be applied to various modulation schemes, such as binary PSK or M-ary PSK where M>4 or Quadrature Amplitude Modulation (QAM).

Numerous modifications and variations of the present invention are possible in light of the above teachings. It is therefore to be understood that within the scope of the appended claims, the invention may be practised otherwise than as specifically described herein.

We claim:

1. A method for equalizing channel distortions in a dual-polarization optical transport system, wherein a received signal is comprised of a complex signal of a first transmitted polarization component and a complex signal of a second transmitted polarization component, the method comprising;
    a blind self-recovery mode comprising a blind adaptation process for recovering the complex signal of the first transmitted polarization component, identifying boundaries of data frames of the complex signal of the first transmitted polarization component and recovering training information contained in the data frames once the boundaries are identified;
    a training mode comprising generating from the recovered training information an estimate of inverse channel characteristics for the complex signals of the first and second transmitted polarization components and using the estimate to compensate for inter-symbol interference (ISI) and non-ideal channel characteristics; and
    a data directed mode for maintaining the estimate of the inverse channel characteristics for the complex signals of the first and second transmitted polarization components and to ensure continuing compensation of the ISI and the non-ideal channel characteristics in view of a time-varying nature of channel characteristics.

2. A method according to claim 1, wherein the blind self-recovery mode further comprises;
    using a blind adaptation process for maximizing a cost function that is used in modifying first and second complex equalizer transfer function coefficients, the first and second complex equalizer transfer function coefficients forming an estimate of the inverse channel characteristics of the first transmitted polarization component and
    using the estimate to recover the complex signal of the first transmitted polarization component so that the boundaries of the data frames are clearly identified and the training information contained within the frames is recovered.

3. A method according to claim 1, wherein the training mode further comprises;
    calculating a first least mean squares (LMS) training mode error that is a function of the training information and which is used in modifying first and second complex equalizer transfer function coefficients, the first and second complex equalizer transfer function coefficients forming an estimate of the inverse channel characteristics of the first transmitted polarization component;
    using the estimate to compensate for the ISI and the non-ideal channel characteristics for the complex signal of the first transmitted polarization component;
    calculating a second LMS training mode error that is a function of the training information and which is used in modifying third and fourth complex equalizer transfer function coefficients, the third and fourth complex equalizer transfer function coefficients forming an estimate of the inverse channel characteristics of the second transmitted polarization component; and
    using the estimate to compensate for the ISI and the non-ideal channel characteristics for the complex signal of the second transmitted polarization component.

4. A method according to claim 1, wherein the data directed mode further comprises;
    calculating a first LMS data directed mode error that is a function of a decision directed estimate of the complex signal of the first transmitted polarization component and which is used in modifying first and second complex equalizer transfer function coefficients, the first and second complex equalizer transfer function coefficients forming an estimate of the inverse channel characteristics of the first transmitted polarization component;
    using the estimate to compensate for the ISI and the non-ideal channel characteristics for the complex signal of the first transmitted polarization component;
    calculating a second LMS data directed mode error that is a function of a decision directed estimate of the complex signal of the second transmitted polarization component and which is used in modifying third and fourth complex equalizer transfer function coefficients, the third and fourth complex equalizer transfer function coefficients forming an estimate of the inverse channel characteristics of the second transmitted polarization component; and
    using the estimate to compensate for the ISI and the non-ideal channel characteristics for the complex signal of the second transmitted polarization component.

5. A method according to claim 2, wherein the blind self-recovery mode further comprises;
    initializing the first and second complex equalizer transfer function coefficients;
    maximizing the cost function of the complex signal of the first transmitted polarization component after it has be acted upon by the first and second complex equalizer transfer function coefficients;
    using a maximized cost function as an input to the calculating and modifying of the first and second complex equalizer transfer function coefficients;
    tracking a carrier phase of the complex signal of the first transmitted polarization component using a phase lock loop type implementation;
    identifying the boundaries of the data frames of the complex signal of the first transmitted polarization component; and
    recovering the training information contained in the data frames.

6. A method according to claim 3, wherein the training mode further comprises;
    initializing third and fourth complex equalizer transfer function coefficients;

generating a first training signal and a second training signal based on the training information identified from within the data frames of the complex signal of the first transmitted polarization component;

using a LMS minimization process to generate the first LMS training mode error, which is a difference between an estimate of the complex signal of the first transmitted polarization component and the first training signal;

using the first LMS training mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

using the LMS minimization process to generate the second LMS training mode error, which is a difference between an estimate of the complex signal of the second transmitted polarization component and the second training signal;

using the second LMS training mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

tracking the carrier phase of the complex signal of the first transmitted polarization component using a first phase lock loop type implementation;

using tracked carrier phase information of the complex signal of the first transmitted polarization component in combination with the equalized version of the complex signal of the first transmitted polarization component to create the estimate of the complex signal of the first transmitted polarization signal;

tracking a carrier phase of the complex signal of the second transmitted polarization component using a second phase lock loop type implementation;

using tracked carrier phase information of the complex signal of the second transmitted polarization component in combination with the equalized version of the complex signal of the second transmitted polarization component to create the estimate of the complex signal of the second transmitted polarization signal; and identifying an acceptable level of convergence of the first, second, third and fourth complex equalizer transfer function coefficients to ensure an acceptable estimate of the inverse channel characteristics of the first and second transmitted polarization components.

7. A method according to claim 4, wherein the data directed mode further comprises;

generating a first decision determined signal that is the decision directed estimate of the complex signal of the first polarization transmitted component and a second decision determined signal that is the decision directed estimate of the complex signal of the second transmitted polarization component;

using an LMS minimization process to generate a first LMS data directed mode error, which is a difference between an estimate of the complex signal of the first transmitted polarization component and the first decision determined signal;

using the first LMS data directed mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

using the LMS minimization process to generate a second LMS data directed mode error, which is a difference between an estimate of the complex signal of the second transmitted polarization component and the second decision determined signal;

using the second LMS data directed mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

tracking the carrier phase of the complex signal of the first transmitted polarization component using a first phase lock loop type implementation;

using tracked carrier phase information of the complex signal of the first transmitted polarization component in combination with the equalized version of the complex signal of the first transmitted polarization component to create the estimate of the complex signal of the first transmitted polarization signal;

tracking a carrier phase of the complex signal of the second transmitted polarization component using a second phase lock loop type implementation; and using tracked carrier phase information of the complex signal of the second transmitted polarization component in combination with the equalized version of the complex signal of the second transmitted polarization component to create the estimate of the complex signal of the second transmitted polarization signal.

8. A method according to claim 5, wherein the training mode further comprises;

initializing third and fourth complex equalizer transfer function coefficients;

generating a first training signal and a second training signal based on the training information identified from within the data frames of the complex signal of the first transmitted polarization component;

using a LMS minimization process to generate the first LMS training mode error, which is a difference between an estimate of the complex signal of the first transmitted polarization component and the first training signal;

using the first LMS training mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

using the LMS minimization process to generate the second LMS training mode error, which is a difference between an estimate of the complex signal of the second transmitted polarization component and the second training signal;

using the second LMS training mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

tracking the carrier phase of the complex signal of the first transmitted polarization component using a first phase lock loop type implementation;

using tracked carrier phase information of the complex signal of the first transmitted polarization component in combination with the equalized version of the complex signal of the first transmitted polarization component to create the estimate of the complex signal of the first transmitted polarization signal;

tracking a carrier phase of the complex signal of the second transmitted polarization component using a second phase lock loop type implementation;

using tracked carrier phase information of the complex signal of the second transmitted polarization component in combination with the equalized version of the complex signal of the second transmitted polarization component to create the estimate of the complex signal of the second transmitted polarization signal; and identifying an acceptable level of convergence of the first, second, third and fourth complex equalizer transfer function coefficients to ensure an acceptable estimate of the inverse channel characteristics of the first and second transmitted polarization components.

9. A method according to claim 8, wherein the data directed mode further comprises;

generating a first decision determined signal that is the decision directed estimate of the complex signal of the first transmitted polarization component and a second decision determined signal that is the decision directed estimate of the complex signal of the second transmitted polarization component;

using an LMS minimization process to generate a first LMS data directed mode error, which is a difference between an estimate of the complex signal of the first transmitted polarization component and the first decision determined signal;

using the first LMS data directed mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

using the LMS minimization process to generate a second LMS data directed mode error, which is a difference between an estimate of the complex signal of the second transmitted polarization component and the second decision determined signal;

using the second LMS data directed mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

tracking the carrier phase of the complex signal of the first transmitted polarization component using a first phase lock loop type implementation;

using tracked carrier phase information of the complex signal of the first transmitted polarization component in combination with the equalized version of the complex signal of the first transmitted polarization component to create the estimate of the complex signal of the first transmitted polarization signal;

tracking a carrier phase of the complex signal of the second transmitted polarization component using a second phase lock loop type implementation; and using tracked carrier phase information of the complex signal of the second transmitted polarization component in combination with the equalized version of the complex signal of the second transmitted polarization component to create the estimate of the complex signal of the second transmitted polarization signal.

10. A computer useable medium having computer readable program code means embodied therein for equalizing channel distortions in a dual-polarization optical transport system, wherein a received signal is comprised of a complex signal of a first transmitted polarization component and a complex signal of a second transmitted polarization component, the computer readable program code means comprising;

code means for performing a blind self-recovery mode comprising a blind adaptation process for recovering the complex signal of the first transmitted polarization component, identifying boundaries of data frames of the complex signal of the first transmitted polarization component and recovering training information contained in the data frames once the boundaries are identified;

code means for performing a training mode comprising generating from the recovered training information an estimate of inverse channel characteristics for the complex signals of the first and second transmitted polarization components and using the estimate to compensate for ISI and non-ideal channel characteristics; and code means for performing a data directed mode for maintaining the estimate of the inverse channel characteristics for the complex signals of the first and second transmitted polarization components and to ensure continuing compensation of the ISI and the non-ideal channel characteristics in view of a time-varying nature of channel characteristics.

11. A computer useable medium according to claim 10, wherein the code means for performing the blind self-recovery mode further comprises;

code means for using a blind adaptation process for maximizing a cost function that is used in modifying first and second complex equalizer transfer function coefficients, the first and second complex equalizer transfer function coefficients forming an estimate of the inverse channel characteristics of the first transmitted polarization component and code means for using the estimate to recover the complex signal of the first transmitted polarization component so that the boundaries of the data frames are clearly identified and the training information contained within the frames is recovered.

12. A computer useable medium according to claim 10, wherein the code means for performing the training mode further comprises;

code means for calculating a first LMS training mode error that is a function of the training information and which is used in modifying first and second complex equalizer transfer function coefficients, the first and second complex equalizer transfer function coefficients forming an estimate of the inverse channel characteristics of the first transmitted polarization component;

code means for using the estimate to compensate for the ISI and the non-ideal channel characteristics for the complex signal of the first transmitted polarization component;

code means for calculating a second LMS training mode error that is a function of the training information and which is used in modifying third and fourth complex equalizer transfer function coefficients, the third and fourth complex equalizer transfer function coefficients forming an estimate of the inverse channel characteristics of the second transmitted polarization component; and code means for using the estimate to compensate for the ISI and the non-ideal channel characteristics for the complex signal of the second transmitted polarization component.

13. A computer useable medium according to claim 10, wherein the code means for performing the data directed mode further comprises;

code means for calculating a first LMS data directed mode error that is a function of a decision directed estimate of the complex signal of the first transmitted polarization component and which is used in modifying first and second complex equalizer transfer function coefficients, the first and second complex equalizer transfer function coefficients forming an estimate of the inverse channel characteristics of the first transmitted polarization component;

code means for using the estimate to compensate for the ISI and the non-ideal channel characteristics for the complex signal of the first transmitted polarization component;

code means for calculating a second LMS data directed mode error that is a function of a decision directed estimate of the complex signal of the second transmitted polarization component and which is used in modifying third and fourth complex equalizer transfer function coefficients, the third and fourth complex equalizer transfer function coefficients forming an estimate of the inverse channel characteristics of the second transmitted polarization component; and code means for using the estimate to compensate for the ISI and the non-ideal channel characteristics for the complex signal of the second transmitted polarization component.

14. A computer useable medium according to claim 11, wherein the computer readable code means for performing the blind self-recovery mode further comprises;

code means for initializing the first and second complex equalizer transfer function coefficients;

code means for maximizing the cost function of the complex signal of the first transmitted polarization component after it has be acted upon by the first and second complex equalizer transfer function coefficients;

code means for using a maximized cost function as an input to the calculating and modifying of the first and second complex equalizer transfer function coefficients;

code means for tracking a carrier phase of the complex signal of the first transmitted polarization component using a phase lock loop type implementation;

code means for identifying the boundaries of the data frames of the complex signal of the first transmitted polarization component; and code means for recovering the training information contained in the data frames.

15. A computer useable medium according to claim 12, wherein the computer readable code means for performing the training mode further comprises;

code means for initializing third and fourth complex equalizer transfer function coefficients;

code means for generating a first training signal and a second training signal based on the training information identified from within the data frames of the complex signal of the first transmitted polarization component;

code means for using a LMS minimization process to generate the first LMS training mode error, which is a difference between an estimate of the complex signal of the first transmitted polarization component and the first training signal;

code means for using the first LMS training mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

code means for using the LMS minimization process to generate the second LMS training mode error, which is a difference between an estimate of the complex signal of the second transmitted polarization component and the second training signal;

code means for using the second LMS training mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

code means for tracking the carrier phase of the complex signal of the first transmitted polarization component using a first phase lock loop type implementation;

code means for using tracked carrier phase information of the complex signal of the first transmitted polarization component in combination with the equalized version of the complex signal of the first transmitted polarization component to create the estimate of the complex signal of the first transmitted polarization signal;

code means for tracking a carrier phase of the complex signal of the second transmitted polarization component using a second phase lock loop type implementation;

code means for using tracked carrier phase information of the complex signal of the second transmitted polarization component in combination with the equalized version of the complex signal of the second transmitted polarization component to create the estimate of the complex signal of the second transmitted polarization signal; and code means for identifying an acceptable level of convergence of the first, second, third and fourth complex equalizer transfer function coefficients to ensure an acceptable estimate of the inverse channel characteristics of the first and second transmitted polarization components.

16. A computer useable medium according to claim 13, wherein the computer readable code means for performing the data directed mode further comprises;

code means for generating a first decision determined signal that is the decision directed estimate of the complex signal of the first transmitted polarization component and a second decision determined signal that is the decision directed estimate of the complex signal of the second transmitted polarization component;

code means for using an LMS minimization process to generate a first LMS data directed mode error, which is a difference between an estimate of the complex signal of the first transmitted polarization component and the first decision determined signal;

code means for using the first LMS data directed mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

code means for using the LMS minimization process to generate a second LMS data directed mode error, which is a difference between an estimate of the complex signal of the second transmitted polarization component and the second decision determined signal;

code means for using the second LMS data directed mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

code means for tracking the carrier phase of the complex signal of the first transmitted polarization component using a first phase lock loop type implementation;

code means for using tracked carrier phase information of the complex signal of the first transmitted polarization component in combination with the equalized version of the complex signal of the first transmitted polarization component to create the estimate of the complex signal of the first transmitted polarization signal;

code means for tracking a carrier phase of the complex signal of the second transmitted polarization component using a second phase lock loop type implementation; and code means for using tracked carrier phase information of the complex signal of the second transmitted polarization component in combination with the equalized version of the complex signal of the second transmitted polarization component to create the estimate of the complex signal of the second transmitted polarization signal.

17. A processing element for equalizing channel distortions in a dual-polarization optical transport system, wherein a received signal is comprised of a complex signal of a first transmitted polarization component and a complex signal of a second transmitted polarization component, the processing element having processing means comprising;

processing means for performing a blind self-recovery mode comprising a blind adaptation process for recovering the complex signal of the first transmitted polarization component, identifying boundaries of data frames of the complex signal of the first transmitted polarization component and recovering training information contained in the data frames once the boundaries are identified;

processing means for performing a training mode comprising generating from the recovered training information an estimate of inverse channel characteristics for the complex signals of the first and second transmitted polarization components and using the estimate to compensate for ISI and non-ideal channel characteristics; and processing means for performing a data directed mode for maintaining the estimate of the inverse channel characteristics for the complex signals of the first and second transmitted polarization components and to ensure continuing compensation of the ISI and the non-ideal channel characteristics in view of a time-varying nature of channel characteristics.

18. A processing element according to claim 17, wherein the processing means for performing the blind self-recovery mode comprises;

processing means for using a blind adaptation process for maximizing a cost function that is used in modifying first and second complex equalizer transfer function coefficients, the first and second complex equalizer transfer function coefficients forming an estimate of the inverse channel characteristics of the first transmitted polarization component and processing means for using the estimate to recover the complex signal of the first transmitted polarization component so that the boundaries of the data frames are clearly identified and the training information contained within the frames is recovered.

19. A processing element according to claim 17, wherein the processing means for performing the training mode comprises;

processing means for calculating a first LMS training mode error that is a function of the training information and which is used in modifying first and second complex equalizer transfer function coefficients, the first and second complex equalizer transfer function coefficients forming an estimate of the inverse channel characteristics of the first transmitted polarization component;

processing means for using the estimate to compensate for the ISI and the non-ideal channel characteristics for the complex signal of the first transmitted polarization component;

processing means for calculating a second LMS training mode error that is a function of the training information and which is used in modifying third and fourth complex equalizer transfer function coefficients, the third and fourth complex equalizer transfer function coefficients forming an estimate of the inverse channel characteristics of the second transmitted polarization component; and processing means for using the estimate to compensate for the ISI and the non-ideal channel characteristics for the complex signal of the second transmitted polarization component.

20. A processing element according to claim 17, wherein the processing means for performing the data directed mode comprises;

processing means for calculating a first LMS data directed mode error that is a function of a decision directed estimate of the complex signal of the first transmitted polarization component and which is used in modifying first and second complex equalizer transfer function coefficients, the first and second complex equalizer transfer function coefficients forming an estimate of the inverse channel characteristics of the first transmitted polarization component;

processing means for using the estimate to compensate for the ISI and the non-ideal channel characteristics for the complex signal of the first transmitted polarization component;

processing means for calculating a second LMS data directed mode error that is a function of a decision directed estimate of the complex signal of the second transmitted polarization component and which is used in modifying third and fourth complex equalizer transfer function coefficients, the third and fourth complex equalizer transfer function coefficients forming an estimate of the inverse channel characteristics of the second transmitted polarization component; and processing means for using the estimate to compensate for the ISI and the non-ideal channel characteristics for the complex signal of the second transmitted polarization component.

21. A processing element according to claim 18, wherein the processing means for performing the blind self-recovery mode further comprises;

processing means for initializing the first and second complex equalizer transfer function coefficients;

processing means for maximizing the cost function of the complex signal of the first transmitted polarization component after it has be acted upon by the first and second complex equalizer transfer function coefficients;

processing means for using a maximized cost function as an input to the calculating and modifying of the first and second complex equalizer transfer function coefficients;

processing means for tracking a carrier phase of the complex signal of the first transmitted polarization component using a phase lock loop type implementation;

processing means for identifying the boundaries of the data frames of the complex signal of the first transmitted polarization component; and processing means for recovering the training information contained in the data frames.

22. A processing element according to claim 19, wherein the processing means for performing the training mode further comprises;

processing means for initializing third and fourth complex equalizer transfer function coefficients;

processing means for generating a first training signal and a second training signal based on the training information identified from within the data frames of the complex signal of the first transmitted polarization component;

processing means for using a LMS minimization process to generate the first LMS training mode error, which is a difference between an estimate of the complex signal of the first transmitted polarization component and the first training signal;

processing means for using the first LMS training mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

processing means for using the LMS minimization process to generate the second LMS training mode error, which is a difference between an estimate of the complex signal of the second transmitted polarization component and the second training signal;

processing means for using the second LMS training mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

processing means for tracking the carrier phase of the complex signal of the first transmitted polarization component using a first phase lock loop type implementation;

processing means for using tracked carrier phase information of the complex signal of the first transmitted polarization component in combination with the equalized version of the complex signal of the first transmitted polarization component to create the estimate of the complex signal of the first transmitted polarization signal;

processing means for tracking a carrier phase of the complex signal of the second transmitted polarization component using a second phase lock loop type implementation;

processing means for using tracked carrier phase information of the complex signal of the second transmitted polarization component in combination with the equalized version of the complex signal of the second transmitted polarization component to create the estimate of the complex signal of the second transmitted polarization signal; and processing means for identifying an acceptable level of convergence of the first, second, third and fourth complex equalizer transfer function coefficients to ensure an acceptable estimate of the inverse channel characteristics of the first and second transmitted polarization components.

23. A processing element according to claim 20, wherein the processing means for performing the data directed mode step further comprises;

processing means for generating a first decision determined signal that is the decision directed estimate of the complex signal of the first transmitted polarization component and a second decision determined signal that is the decision directed estimate of the complex signal of the second transmitted polarization component;

processing means for using an LMS minimization process to generate a first LMS data directed mode error, which is a difference between an estimate of the complex signal of the first transmitted polarization component and the first decision determined signal;

processing means for using the first LMS data directed mode error in calculating and modifying the first and second complex equalizer transfer function coefficients, whereby the first and second complex equalizer transfer function coefficients act upon the complex signal of the first transmitted polarization component to generate an equalized version of the complex signal of the first transmitted polarization component;

processing means for using the LMS minimization process to generate a second LMS data directed mode error, which is a difference between an estimate of the complex signal of the second transmitted polarization component and the second decision determined signal;

processing means for using the second LMS data directed mode error in calculating and modifying the third and fourth complex equalizer transfer function coefficients, whereby the third and fourth complex equalizer transfer function coefficients act upon the complex signal of the second transmitted polarization component to generate an equalized version of the complex signal of the second transmitted polarization component;

processing means for tracking the carrier phase of the complex signal of the first transmitted polarization component using a first phase lock loop type implementation;

processing means for using tracked carrier phase information of the complex signal of the first transmitted polarization component in combination with the equalized version of the complex signal of the first transmitted polarization component to create the estimate of the complex signal of the first transmitted polarization signal;

processing means for tracking a carrier phase of the complex signal of the second transmitted polarization component using a second phase lock loop type implementation; and processing means for using tracked carrier phase information of the complex signal of the second transmitted polarization component in combination with the equalized version of the complex signal of the second transmitted polarization component to create the estimate of the complex signal of the second transmitted polarization signal.

24. A processing element according to claim 17,
wherein the processing element is used for equalizing channel distortions of the received signal at a receiver end of a dual-polarization optical transport system comprising a transmitter, fiber transmission channel, and the optical coherent receiver,
wherein the optical coherent receiver comprises a local oscillator laser, first and second 90 degree optical hybrids, photodetection means, AC coupling means, analog to digital converter means, and the processing element.

25. A processing element according to claim 17, wherein the processing element is an application-specific integrated circuit (ASIC).

26. A method according to claim 1, wherein a modulation scheme used to modulate a transmitted signal received by the optical coherent receiver is one of binary PSK, quadri-phase shift keying (QPSK), M-ary PSK where M>=4, and Quadrature Amplitude Modulation (QAM).

27. An optical coherent receiver comprising a local oscillator laser, first and second 90 degree optical hybrids, photodetection means, AC coupling means and analog to digital converter means, and digital signal processing means;

wherein the digital signal processing means comprises a processing element for performing a blind self-recovery mode comprising a blind adaptation process for recovering a complex signal of a first transmitted polarization component, identifying boundaries of data frames of the complex signal of the first transmitted polarization component and recovering training information contained in the data frames once the boundaries are identified;

a training mode comprising generating from the recovered training information an estimate of inverse channel characteristics for the complex signals of the first and second transmitted polarization components and using the estimate to compensate for ISI and the non-ideal channel characteristics; and a data directed mode for maintaining the estimate of the inverse channel characteristics for the complex signals of the first and second transmitted polarization components and to ensure continuing compensation of the ISI and the non-ideal channel characteristics in view of a time-varying nature of channel characteristics.

28. A dual-polarization optical transport system comprising a transmitter, fiber transmission channel, and an optical coherent receiver;

wherein the optical coherent receiver comprises a local oscillator laser, first and second 90 degree optical hybrids, photodetection means, AC coupling means and analog to digital converter means, and digital signal processing means;

wherein the digital signal processing means comprises a processing element for performing a blind self-recovery mode comprising a blind adaptation process for recovering a complex signal of a first transmitted polarization component, identifying boundaries of data frames of the complex signal of the first transmitted polarization component and recovering training information contained in the data frames once the boundaries are identified;

a training mode comprising generating from the recovered training information an estimate of inverse channel characteristics for the complex signals of the first and second transmitted polarization components and using the estimate to compensate for ISI and the non-ideal channel characteristics; and a data directed mode for maintaining the estimate of the inverse channel characteristics for the complex signals of the first and second transmitted polarization components and to ensure continuing compensation of the ISI and the non-ideal channel characteristics in view of a time-varying nature of channel characteristics.

* * * * *